United States Patent [19]

De Schepper et al.

[11] 4,432,952
[45] Feb. 21, 1984

[54] PROCESS FOR SEPARATING GERMANIUM FROM AN AQUEOUS SOLUTION BY MEANS OF AN ALPHAHYDROXYOXIME

[75] Inventors: Achille De Schepper, Lichtaart-Kasterlee; Marc Coussement, Hove; Antoine Van Peteghem, Olen, all of Belgium

[73] Assignee: Metallurgie Hoboken-Overpelt, Brussels, Belgium

[21] Appl. No.: 421,251

[22] Filed: Sep. 22, 1982

Related U.S. Application Data

[63] Continuation of Ser. No. 285,581, Jul. 21, 1981, abandoned.

[30] Foreign Application Priority Data

Jun. 22, 1981 [LU] Luxembourg ............... 83449

[51] Int. Cl.³ .................... B01D 11/04; C01G 17/00
[52] U.S. Cl. .................................................. 423/89
[58] Field of Search .......................... 423/89, 98, 99

[56] References Cited

U.S. PATENT DOCUMENTS 3,883,634  5/1975  De Schepper et al. ............. 423/89
4,389,379  7/1983  Bauer et al. ......................... 423/89

Primary Examiner—Edward J. Meros
Assistant Examiner—Wayne A. Langel
Attorney, Agent, or Firm—Fred Philpitt

[57] ABSTRACT

A substituted 8-hydroxyquinoline is added to the alphahydroxyoxime extractant, which allows extracting germanium at lower acidity and with a better yield.

7 Claims, 2 Drawing Figures

PROCESS FOR SEPARATING GERMANIUM FROM AN AQUEOUS SOLUTION BY MEANS OF AN ALPHAHYDROXYOXIME

This application is a continuation of application Ser. No. 285,581, filed July 21, 1981, abandoned.

The present invention relates to a process for separating germanium from an germanium containing aqueous acid solution according to which
  (a) the solution is contacted with an organic liquid containing an alphahydroxyoxime, thereby producing a germanium-loaded organic phase and an aqueous phase depleted in germanium;
  (b) the germanium-loaded organic phase is separated from the aqueous phase depleted in germanium;
  (c) the germanium-loaded organic phase is contacted with an aqueous basic solution, thereby producing an organic phase depleted in germanium and a germanium-loaded basic aqueous phase; and
  (d) the organic phase depleted in germanium is separated from the germanium-loaded basic aqueous phase.

A similar process is described in the U.S. Pat. No. 3,883,634. According to this patent an organic liquid is used composed of an alphahydroxyoxime-containing extracting agent, diluted or not by an inert organic solvent such as kerosene. In the examples given in this patent, the product sold by the firm Henkel under the trade mark "LIX 63" is used as an alphahydroxyoxime-containing extracting agent. The alphahydroxyoxime present in "LIX 63" (5,8-diethyl-7-hydroxy-dodecane-6-oxime) was disclosed in the U.S. Pat. No. 3,224,837 and has the general formula

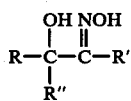
(I)

in which R and R' represent hydrocarbon radicals and R" a hydrocarbon radical or hydrogen.

The examples of the before mentioned U.S. Pat. No. 3,883,634 deal with germanium recovery from aqueous solutions containing Ge, As, Zn, Ni, Cu, Fe, Cl and from 130 to 460 g/l of H2SO4; germanium is extracted with an organic liquid consisting either of non-diluted "LIX 63" or of "LIX 63" diluted with 50 percent kerosene, or of "LIX 63" diluted with 30 percent of kerosene; germanium is re-extracted from the germanium loaded organic liquid by means of an aqueous solution of NaOH containing 175 g/l of NaOH. The patent stipulates that the extracting power of the alpha-hydroxyoxime for germanium increases with the acidity of the aqueous solution, i.e. that the distribution coefficient of germanium between the organic phase and the aqueous phase increases with the acidity of the aqueous phase. Consequently the process described in the U.S. Pat. No. 3,883,634 lends itself better to the treatment of very acid germaniferous aqueous solutions than to the treatment of germaniferous aqueous solutions with low acidity, e.g. solutions with an acidity lower than 1.5 N.

The aim of the present invention is to provide a process as defined before that lends itself much better than the above-mentioned known process to the treatment of germaniferous aqueous solutions with low acidity and that lends itself even better than this known process to the treatment of germaniferous aqueous solutions with a high acidity.

Therefore, according to the invention a substituted 8-hydroxyquinoline is added to the organic liquid.

Such a compound has the general formula

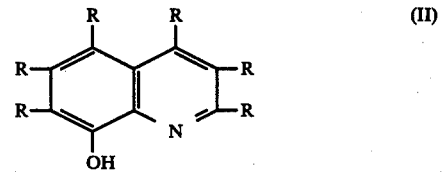
(II)

where R is hydrogen or a hydrocarbyl group such as alkyl, alkenyl, cycloaliphatic, aryl or a combination thereof (for instance, alkaryl, aralkenyl, alkylcycloalkyl, aralkyl, etc.), at least one of the Rs being such a hydrocarbyl group.

Amongst the compounds of formula II, the 7-alkenyl-8-hydroxyquinolines, numerous representatives of which are described in the U.S. Pat. No. 3,637,711, are the most interesting ones. A 7-alkenyl-8-hydroxyquinoline may be used, the alkenyl group of which is composed of

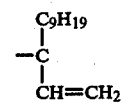

and that is sold under the trade mark "Kelex 100" by the firm Sherex. A 7-alkenyl-8-hydroxyquinoline sold under the trade mark "LIX 26" by the company Henkel.

Alphahydroxyoximes, that can be used in the process of the present invention, are described in the before mentioned U.S. Pat. No. 3,224,837.

THE DRAWINGS

Figure 1:
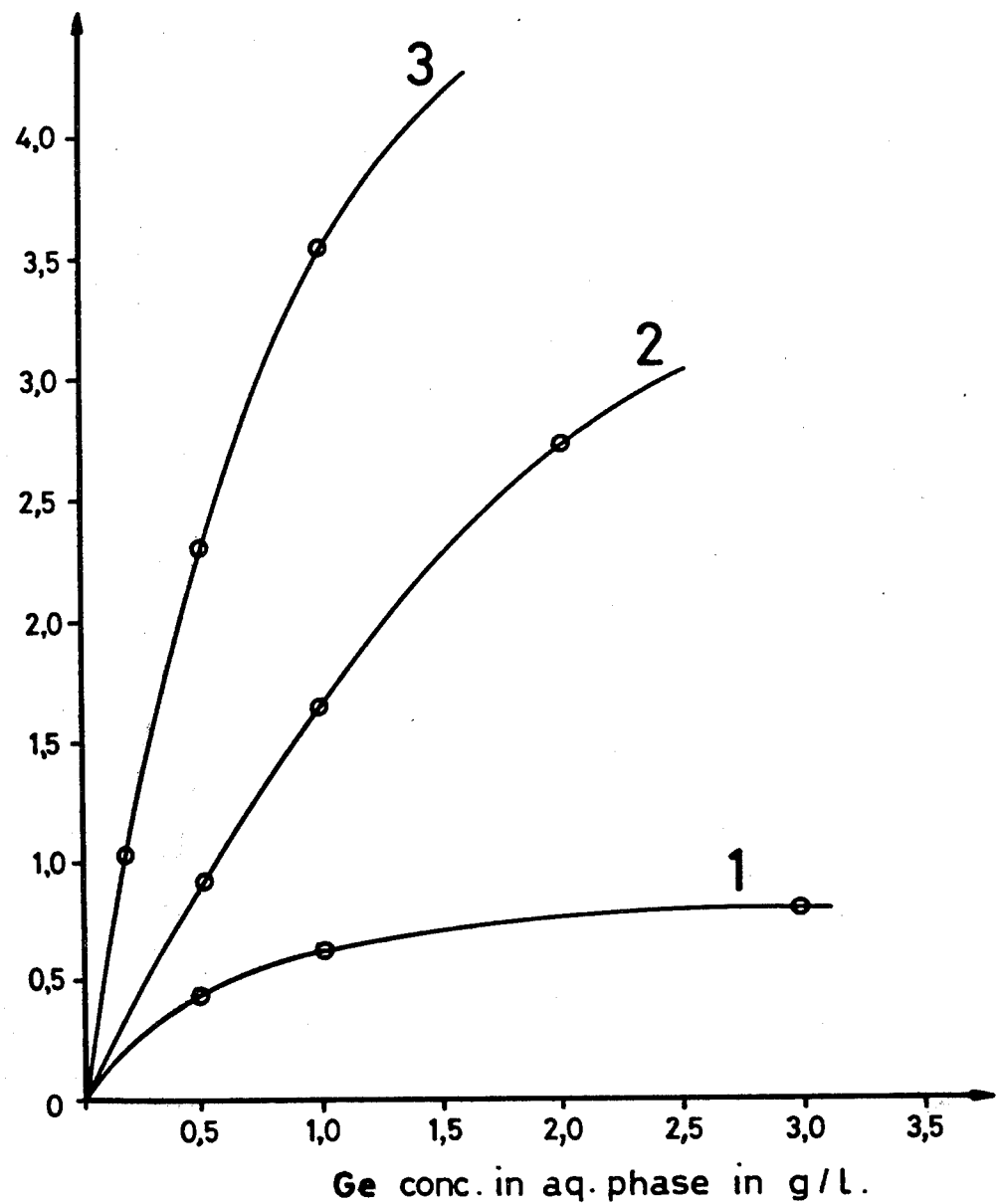
FIG. 1 represents extraction curves of germanium from an aqueous solution.

It was found by the applicants that there is a remarkable synergy for germanium extraction between the alphahydroxyoximes of formula I and the substituted 8-hydroxyquinolines of formula II, as it is clearly illustrated by the diagram of the accompanying FIG. 1, that represents:
  in 1 the extraction curve of germanium from an aqueous solution, containing 30 g H2SO4 per liter and 20 HCl per liter, by means of an organic liquid composed of 2 percent in volume of "LIX 26", of 25 percent in volume of isodecanol and of 77 percent in volume of kerosene (isodecanole being an agent that avoids the formation of emulsions and kerosene being an inert diluent);
  in 2 the extraction curve of germanium from the same aqueous solution by means of an organic liquid composed of 100 percent "LIX 63"; and
  in 3 the extraction curve of germanium from the same aqueous solution by means of an organic liquid composed of 99 percent in volume of "LIX 63" and of 1 percent in volume of "LIX 26".

One sees that a concentration of 1 g Ge per liter in the aqueous phase is in equilibrium with a concentration of 0.625 g of Ge per liter in the organic phase in the first case (curve 1), with a concentration of 1.63 g Ge per liter in the organic phase in the second case (curve 2) and with a concentration of 3.55 g Ge per liter in the organic phase in the third case (curve 3). The latter concentration (3.55 g/l) is thus remarkably superior to the sum of both preceding concentrations (2.255=0.625+1.63), which proves that there is synergy in the third case; otherwise a Ge concentration that is noticeably lower than 2.255 g/l should have been found in the third case, since in this third case only 1 percent in volume of "LIX 26" is used versus 2 percent in the first case.

Similar results were obtained with mixtures of "LIX 63" and "Kelex 100".

It should be noticed that it was already known that germanium is extracted in acid medium by a substituted 8-hydroxyquinoline ("Hydrometallurgy", 1980, no 5, p. 149–160). It was, however, not yet known that there were improved results using both the alphahydroxyoximes and the substituted 8-hydroxyquinolines according to the present invention.

This synergy appears clearly when 0.5 percent in volume of the substituted 8-hydroxyquinoline is added to the organic liquid. Although this synergy still exists when more than 5 percent in volume of the substituted 8-hydroxyquinoline is added to the organic liquid, it is not advisable to use an organic liquid with such a content of substituted 8-hydroxyquinoline, since it becomes then very difficult to re-extract the germanium from the organic liquid, unless this re-extraction i.e. steps (c) and (d), is carried out under the special conditions that are described in the U.S. patent application entitled "Process for separating germanium from an aqueous solution" Ser. No. 285,580 filed on the very day as the present application by the application of the present application.

It should be noticed that part of the acid present in the germanium-containing starting solution is coextracted by the organic liquid in step (a) with the germanium, if this organic liquid was not previously acidified, i.e. contained with an acid solution. Hence, the aqueous phase depleted in germanium produced in step (a), has a lower acidity than the aqueous starting solution, provided the organic liquid was not acidified before.

It is advantageous to take care that the acidity of the aqueous phase depleted in germanium, produced in step (a) (and separated in step (b)) shall not be lower than 0.1 N, as otherwise the extraction yield of germanium becomes small.

A very high acidity of e.g. 8 N does not impede at all in step (a). The process of the present invention enables thus to treat very acid germanium-containing aqueous solutions. The only drawback resulting from the treatment of very acid solutions lies in the fact that subsequently in step (c) much acid has to be neutralized. For this reason it is not indicated to use an aqueous starting solution with an acidity higher than 2 N, unless the conditions for preparing the starting solution, e.g. by lixiviation of a germaniferous material, impose an acidity that is higher than 2 N.

If one wishes to produce in step (a) an aqueous phase depleted in germanium with a predetermined acidity, an organic liquid, that was not acidified before, can be used in which case however either an aqueous starting solution should be used, the acidity of which is considerably higher than said predetermined acidity or acid should be added during step (a).

In order to reach the same object it is, however, more advantageous to use a previously acidified organic liquid and a starting solution, the acidity of which is not much different from said predetermined acidity, as will be explained later on.

It is very useful to provide between steps (b) and (c) a washing operation, that consists in contacting the germanium-loaded organic phase with water. In this way, part of the acid operated in the organic phase is re-extracted therefrom, which part had otherwise to be neutralised. If the germanium-loaded organic phase contains impurities such as iron and arsenic, part of these impurities is also re-extracted. So, by this washing operation one produces, on the one hand, a partly desacidified and partly purified germanium-loaded organic phase and, on the other hand, an impure acid aqueous phase. After separation of these phase the organic phase is sent to step (c) and the aqueous phase can be added to starting solution, that still has to go through step (a).

The organic phase depleted in germanium resulting from step (d) and that still may contain impurities such as Fe, can be recycled as such towards step (a). It is, however, preferably to acidify this organic phase, before its recycling, by contacting it with an acid aqueous solution, since duroing this operation the iron passes from the organic phase into the aqueous phase; thus after separation of both phases, a purified organic phase may be recycled.

Figure 2:
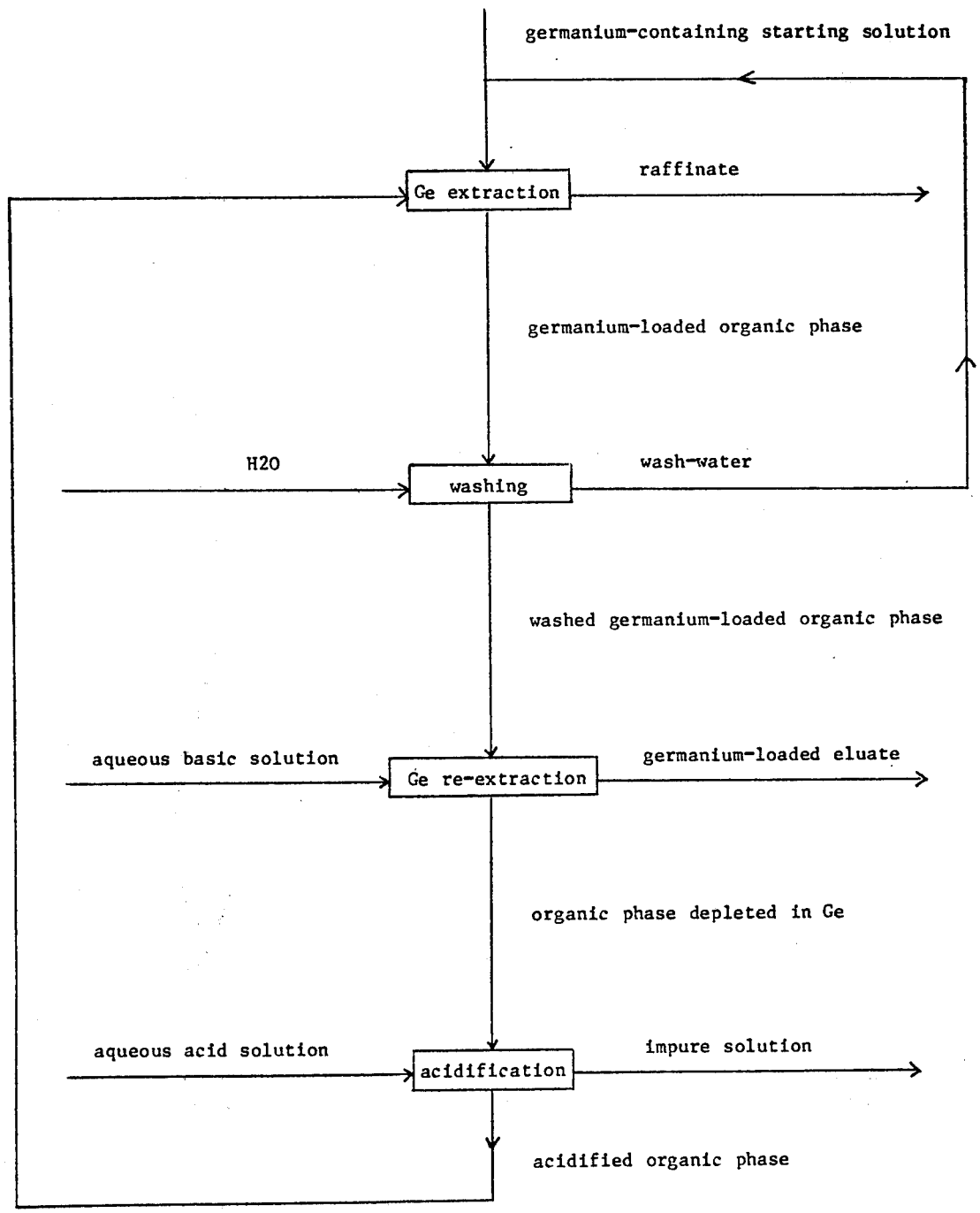
FIG. 2 is a flow sheet showing a preferred mode of carrying out the process of the invention.

A preferred mode of carrying out the process of the invention is illustrated by the flow-sheet of FIG. 2. It comprises essentially the following liquid-liquid extracting operations: germanium extraction from the starting solution, washing of the germanium-loaded organic phase, re-extraction of germanium from the washed germanium-loaded organic phase and acidification of the unloaded organic phase. Each of these operations can be carried out in a conventional liquid-liquid extraction apparatus, for instance in a mixer-settler when the operation is carried out in one stage or in a mixer-settler battery when it is operated in several stages.

It should be noticed that the process of the present invention is particularly useful for treating germanium-containing aqueous solutions which are almost free from copper, i.e. solutions containing less than 0.1 g/l and preferably less than 0.01 g of Cu per liter, since the applicnts found that copper is a poison for the alphahydroxyoxime in this way that the alphahydroxyoxime fixes copper both in acid medium and in basic medium, so that it can no longer be separated from the alphahydroxyoxime. It is thus advisable to use the process claimed in the above-mentioned U.S. patent application, for treating germanium-containing aqueous solutions with a substantial copper content.

EXAMPLE

This example relates to the separation of germanium from an aqueous solution containing in g/l: 3.5 Ge; 0.8 As; 1.5 $Fe^{3+}$; 50 $H_2SO_4$.

The organic liquid is composed of 99 percent in volume of "LIX 63" and 1 percent in volume of "LIX 26" and it contains 4.5 g of $H_2SO_4$ per liter.

All following operations are carried out at the ambient temperature.

Germanium extraction is carried out counter-currently, in 4 stages and with a volumetric ratio between the organic phase and the aqueous phase (hereafter called O:A ratio) of 1:1.

In this way a germanium-loaded organic phase and a raffinate, that is almost free from germanium, are obtained. The organic phase contains in g/l: 3.49 Ge; 0.2 As; 0.4 $Fe^{3+}$; 3 $H_2SO_4$. The raffinate contains in g/l: 0.005 Ge; 0.6 As; 1.1 $Fe^{3+}$; 51.5 $H_2SO_4$.

The germanium-loaded organic phase is washed with water. This operation is carried counter-currently, in 2 stages and with a O:A ratio of 10:1.

In this way a washed germanium-loaded organic phase and an acid wash-water are obtained. The washed germanium-loaded organic phase contains in g/l: 3.37 Ge; 0.05 As; 0.31 $Fe^{3+}$; 0.5 $H_2SO_4$. The acid wash-water contains in g/l: 1.2 Ge; 1.5 As; 0.9 Fe; 25 $H_2SO_4$.

Germanium is re-extracted from the washed germanium-loaded organic phase with an aqueous solution of NaOH containing 150 g of NaOH per liter. This operation is carried counter-currently in 5 stages and with a O:A ratio of 10:1.

In this way an organic phase depleted in germanium and a germanium-loaded eluate are obtained. The organic phase depleted in germanium, contains in g/l: 0.015 Ge; O As; 0.31 $Fe^{3+}$. The germanium-loaded eluate contains in g/l: 33.69 Ge; 0.5 As; O $Fe^{3+}$.

The organic phase depleted in germanium is acidified with an aqueous $H_2SO_4$ solution containing 250 g $H_2SO_4$ per liter, in one stage and with a O:A ratio of 5:1.

In this way a regenerated organic phase and an impure aqueous solution are obtained. The regenerated organic phase contains in g/l: 0.015 Ge; 0.01 $Fe^{3+}$; 4.5 $H_2SO_4$. The impure aqueous solution contains in g/l: 0.001 Ge; 1.5 $Fe^{3+}$; 150 $H_2SO_4$.

We claim:

1. Process for separating germanium from a germanium-containing aqueous acid solution, comprising the steps of
   (a) contacting the solution with an organic liquid containing an aliphatic alpha-hydroxyoxime and a substituted 8-hydroxyquinoline, thereby producing a germanium-loaded organic phase and an aqueous phase depleted in germanium;
   (b) separating the germanium-loaded organic phase from the aqueous phase depleted in germanium;
   (c) contacting the germanium-loaded organic phase with an aqueous basic solution, thereby producing an organic phase depleted in germanium and a germanium-loaded basic aqueous phase; and
   (d) separating the organic phase depleted in germanium from the germanium-loaded basic aqueous phase.

2. A process according to claim 1 characterized in that the organic liquid contains from 0.5 to 5 percent in volume of the substituted 8-hydroxyquinoline.

3. A process according to claim 1 or 2 characterized in that in step (a) an aqueous phase depleted in germanium is produced, the acidity of which is at least 0.1 N.

4. A process according to claim 1 characterized in that germanium-containing aqueous acid solution is used that has a copper content of less than 0.1 g/l.

5. A process according to claim 1 characterized in that the germanium-loaded organic phase resulting from step (b) is washed with water.

6. A process according to claim 1 characterized in that the organic phase depleted in germanium resulting from step (d) is acidified.

7. A process according to claim 1 characterized in that a 7-alkenyl-8-hydroxyquinoline is used as a 8-hydroxyquinoline.

* * * * *